United States Patent
Slater (10) Patent No.: US 11,221,233 B2
(45) Date of Patent: Jan. 11, 2022

(54) UTILITY COVER FOR USE WITH AUTOMATED METERING EQUIPMENT

(71) Applicant: Hubbell Incorporated, Shelton, CT (US)

(72) Inventor: Eric M. Slater, Lenoir City, TN (US)

(73) Assignee: HUBBELL INCORPORATED, Shelton, CT (US)

( * ) Notice: Subject to any disclaimer, the term of this patent is extended or adjusted under 35 U.S.C. 154(b) by 187 days.

(21) Appl. No.: 16/338,217

(22) PCT Filed: Sep. 21, 2017

(86) PCT No.: PCT/US2017/052637
§ 371 (c)(1),
(2) Date: Mar. 29, 2019

(87) PCT Pub. No.: WO2018/067315
PCT Pub. Date: Apr. 12, 2018

(65) Prior Publication Data
US 2019/0226874 A1     Jul. 25, 2019

Related U.S. Application Data

(60) Provisional application No. 62/405,094, filed on Oct. 6, 2016.

(51) Int. Cl.
*F16M 13/02* (2006.01)
*G01D 4/02* (2006.01)
(Continued)

(52) U.S. Cl.
CPC ............... *G01D 4/02* (2013.01); *F16M 13/02* (2013.01); *G08C 17/02* (2013.01); *H04Q 9/00* (2013.01);
(Continued)

(58) Field of Classification Search
CPC ........ G01D 4/02; H04Q 9/00; H04Q 2209/40; H04Q 2209/80; F16M 13/02; G08C 17/02; Y02B 90/20; Y04S 20/30
See application file for complete search history.

(56) References Cited

U.S. PATENT DOCUMENTS

| | | |
|---|---|---|
| 317,153 A | 5/1885 | Lowrie |
| 2,608,085 A | 8/1952 | Castle |
| (Continued) | | |

FOREIGN PATENT DOCUMENTS

| | | |
|---|---|---|
| CN | 2764821 | 3/2006 |
| JP | 1161867 | 3/1999 |
| (Continued) | | |

OTHER PUBLICATIONS

International Search Report and Written Opinion mailed in PCT/US2017/052637 dated Nov. 30, 2017.
(Continued)

*Primary Examiner* — Suman K Nath
(74) *Attorney, Agent, or Firm* — Wissing Miller LLP (57) ABSTRACT

Utility covers and utility cover assemblies for use with automated metering infrastructure equipment are provided. The utility cover includes a body having one or more windows that permit electromagnetic energy to pass through the body with limited or no attenuation. One or more plugs made of a material substantially transparent to electromagnetic energy seals the one or more windows to limit or prevent moisture to pass through the one or more windows.

20 Claims, 13 Drawing Sheets

(51) Int. Cl.
*G08C 17/02* (2006.01)
*H04Q 9/00* (2006.01)

(52) U.S. Cl.
CPC ..... *H04Q 2209/40* (2013.01); *H04Q 2209/80* (2013.01); *Y02B 90/20* (2013.01); *Y04S 20/30* (2013.01)

(56) References Cited

U.S. PATENT DOCUMENTS

| | | | |
|---|---|---|---|
| 2,697,389 | A | 12/1954 | Heckman |
| 3,530,696 | A | 9/1970 | Dunmire |
| 4,834,574 | A | 5/1989 | Bowman |
| 4,969,771 | A | 11/1990 | Bowman |
| 5,123,776 | A | 6/1992 | Lang |
| 5,240,346 | A | 8/1993 | Yin |
| 5,583,492 | A | 12/1996 | Nakanishi |
| 6,414,605 | B1 | 7/2002 | Walden |
| 7,619,878 | B1 | 11/2009 | Cook |
| 8,258,977 | B1 | 9/2012 | Montestruque |
| 9,258,992 | B2 | 2/2016 | Shefer |
| 2001/0011009 | A1 | 8/2001 | Harada |
| 2003/0178425 | A1* | 9/2003 | McKinnon ............... H02G 3/14 220/254.3 |
| 2004/0042849 | A1 | 3/2004 | Jurich |
| 2007/0194493 | A1 | 8/2007 | Jurich |
| 2008/0050175 | A1 | 2/2008 | Brady |
| 2008/0074283 | A1 | 3/2008 | Verkleeren |
| 2010/0019912 | A1 | 1/2010 | Wander |
| 2011/0006182 | A1* | 1/2011 | Hockema ................. H01Q 1/00 248/224.8 |
| 2012/0098710 | A1 | 4/2012 | Seal |
| 2012/0114414 | A1 | 5/2012 | Jang |
| 2013/0011194 | A1 | 1/2013 | Lorenz |
| 2013/0212945 | A1 | 8/2013 | Lanham |
| 2013/0301190 | A1 | 11/2013 | Metzger |
| 2014/0144067 | A1 | 5/2014 | Shefer |
| 2014/0268506 | A1 | 9/2014 | Emanuel |
| 2015/0122959 | A1 | 5/2015 | Cook |
| 2016/0069039 | A1 | 3/2016 | Johnson |
| 2016/0094897 | A1 | 3/2016 | Kenig |
| 2017/0023612 | A1 | 1/2017 | Brown |
| 2018/0013934 | A1* | 1/2018 | Germe ................. H04N 5/2252 |

FOREIGN PATENT DOCUMENTS

| | | |
|---|---|---|
| KR | 200406184 | 1/2006 |
| KR | 100566663 | 3/2006 |
| KR | 20070011703 | 1/2007 |

OTHER PUBLICATIONS

Elan Technologies Inc. Product Sheet, Comcore (R) Manhole Antenna Cover, (2 pages) 2008.
Hubbell Power Systems Power Sheet, "Antenna Covers" 2001.

\* cited by examiner

UTILITY COVER FOR USE WITH AUTOMATED METERING EQUIPMENT

CROSS-REFERENCE TO RELATED APPLICATIONS

This application is a 371 of PCT/US2017/052637 filed on Sep. 21, 2017, published on Apr. 12, 2018 under publication number WO 2018/067315 A1, which claims priority benefits from U.S. Provisional Application No. 62/405,094, filed on Oct. 6, 2016, both of which are incorporated herein in their entirety by reference.

BACKGROUND

Field

The present disclosure relates generally to utility covers, and more particularly to utility covers for use with automated metering equipment.

Description of the Related Art

Water, electric and gas utilities often use subterranean passages or tunnels as conduits, with surface access openings. Such surface access openings, sometimes referred to as manholes, are ordinarily covered by utility covers, sometimes referred to as manhole covers. To access the manhole, workers would remove the utility cover from an access opening, and subsequently replace the utility cover over the access opening.

Traditional utility covers are constructed from cast-iron or steel and fit into a mating surface of a manhole ring or frame also made from cast-iron or steel. The utility cover installed onto such a frame can typically endure vehicle and pedestrian traffic.

Smaller covers are used to cover smaller openings used in other applications. For example, smaller openings may provide access to subterranean utility meters or service valves at a street or sidewalk location. When installed, such smaller covers are typically subjected to pedestrian and/or vehicle traffic. The smaller covers are removed temporarily when workmen want access to the underlying utility meters or service valves and replaced when the workmen are done.

Traditional utility cover assemblies cover ground openings and provide a surface to support pedestrian and/or vehicular traffic. In some cases, utility cover assemblies also provide access to subterranean electronic modules, such as automated meter reading equipment and associated radio and antenna systems. However, many traditional utility assemblies are made entirely of electrically conductive material such as metal and therefore interfere with the transfer (transmission/reception) of electromagnetic signals. Alternative utility cover assemblies may be made of electrically non-conductive material such as polymer concrete which tends to attenuate the transfer (transmission/reception) of electromagnetic signals. Plastic may be "RF transparent." However, the use of plastic in utility covers has attendant problems including possible failure due to exposure to hot paving materials or sunlight. Accordingly, such traditional utility cover assemblies may not be suitable in applications where electromagnetic signals are being emitted and/or received by an electronic module provided below the utility cover.

SUMMARY

The present disclosure provides utility covers for use with automated metering equipment that emit electromagnetic signals. In one exemplary embodiment, the utility cover includes a body having an upper side and a bottom side, a window within the body through which electromagnetic energy may pass through the body, and a plug positioned within the window. The plug is positioned at least at the upper side of the body. The body is made from a material capable of supporting pedestrian or vehicle traffic and the plug is made from a material that is substantially transparent to electromagnetic energy so that electromagnetic energy can pass through the window without being substantially attenuated.

In another exemplary embodiment, the utility cover includes a body and an electronic module. The body has an upper side and a bottom side, a window through which electromagnetic energy may pass through the body, and a plug positioned within the window at least at the upper side of the body. The body is made from a material capable of supporting pedestrian or vehicle traffic and the plug is made from a material that is substantially transparent to electromagnetic energy so that electromagnetic energy can pass through the window without being substantially attenuated. The electronic module is positioned on the lower side of the body proximate the window and capable of transmitting electromagnetic energy or receiving electromagnetic energy.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides embodiments of utility covers and utility cover assemblies for use with automated metering equipment. The exemplary embodiments of the utility cover according to the present disclosure include a portion that permits electromagnetic energy, e.g., radio frequency (RF) signals, to pass through the utility cover with limited or no attenuation.

The exemplary embodiments of the of the utility cover assemblies according to the present disclosure include a utility cover and an electronic module capable of transmitting and/or receiving electromagnetic signals, such as an RF transmitter/receiver module, positioned in close proximity to the utility cover. The utility cover assemblies as described herein may be utilized to cover, for example, utility meters and/or utility valves including water, gas and electric meters and gas and water valves. The utility cover assemblies according to the present disclosure provide the capability to interact or communicate with meters or valves below grade without having to remove the utility cover enclosing the meter or valve, while also providing traditional utility cover functionality.

In certain exemplary embodiments, the utility cover is comprised of a main body having a window and a plug that fits into and seals the window. The plug is made of a material that is substantially transparent to electromagnetic energy, e.g., an RF transparent material. In certain exemplary embodiments, the utility cover assembly is comprised of a utility cover having a body, a window in the body and a plug that fits into and seals the window, and an electronic module secured to the body in close proximity to the window that is capable of transmitting and/or receiving electromagnetic signals.

Referring now to the figures, a utility cover assembly according to an exemplary embodiment of the present disclosure is shown in FIGS. 1-4. The utility cover assembly 10 includes a utility cover 20 and an electronic module 50 secured to the utility cover with a mounting bracket 60. The utility cover 20 includes a body 22 having an upper side 24 and a lower side 26. The body 22 also includes one or more windows 28 and one or more plugs 30 where one plug fills at least a portion of one window 28. In the embodiment of FIGS. 1-6, the body 22 has one window 28 and one plug 30. In the embodiments of FIGS. 7-11, the body 22 has multiple windows 28 and multiple plugs 30, such as four windows and four plugs.

The body 22 may be circular in shape, square in shape, rectangular in shape or any other shape, and is dimensioned to fit within a frame that typically is secured to a pipe or enclosure. The body 22 is made of a rigid material sufficient to support pedestrian and/or vehicle traffic. Examples of suitable materials include cast iron, steel, and aluminum. In the embodiment shown, the body 22 is circular in shape and has a diameter dimensioned to fit within a circular frame such as, for example, a cast iron frame 100, seen in FIG. 12. The upper side 24 of the body may include one or more slip resistant members 32. The slip resistant member or members 32 may comprise, for example, treads shown in FIG. 1, anti-slip paints, anti-slip tapes, or other anti-slip materials or structures. The body 22 may also include a channel 34 or other opening in which a tool may be inserted in order to lift the utility cover 20.

The one or more windows 28 in the body 22 may be circular in shape (seen in FIGS. 4 and 7), rectangular in shape (seen in FIG. 5), square in shape or any other shape, and are dimensioned to provide a window through which electromagnetic energy may pass. The one or more windows 28 in the body 22 may be positioned at any location on the body. In the embodiment shown in FIGS. 1-4, the window 28 is a circular opening in a central area of the body 22. The window 28 may have outer periphery dimension 28a, e.g., diameter, at the upper side 24 of the body 22 and inner periphery dimension 28b, e.g., diameter, at the lower side 26 of the body, where the outer periphery dimension 28a is larger than the inner periphery dimension 28b. In another embodiment, the window 28 may have the same periphery dimension throughout. In the embodiments shown in FIGS. 7-11, each of the multiple windows 28 is a circular opening with one window located in a central area of the body 22 and the remaining windows located in an area between the central area of the body 22 and an outer edge of the body 22. Each window 28 in this embodiment may be the same as the window described above. For example, each window 28 may have outer periphery dimension 28a, e.g., diameter, at the upper side 24 of the body 22 and inner periphery dimension 28b, e.g., diameter, at the lower side 26 of the body, where the outer periphery dimension 28a is larger than the inner periphery dimension 28b. In another embodiment, each window 28 may have the same periphery dimension throughout.

Figure 9:
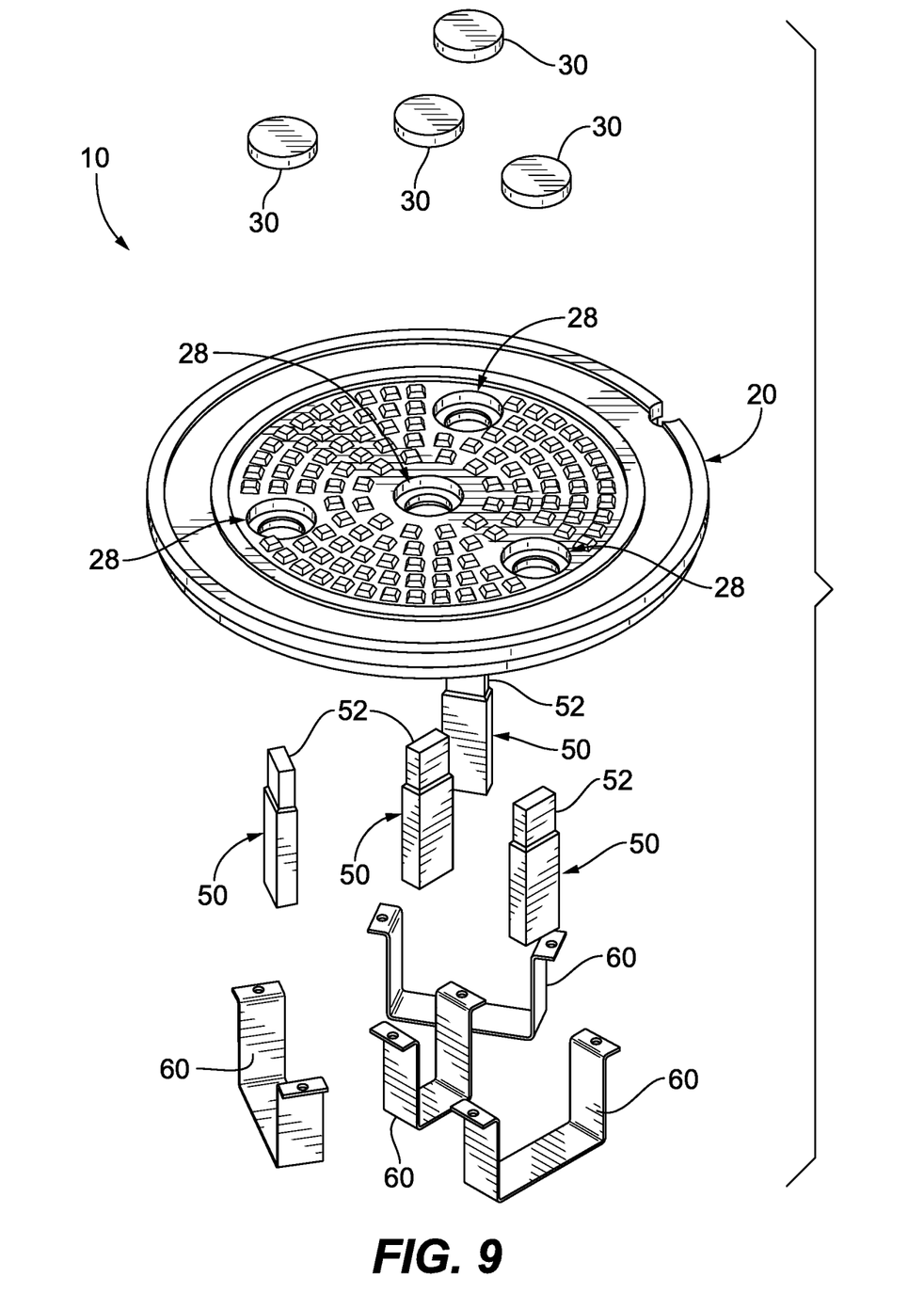
FIG. 9 is an exploded view of the utility cover assembly of FIG. 7.
Figure 10:
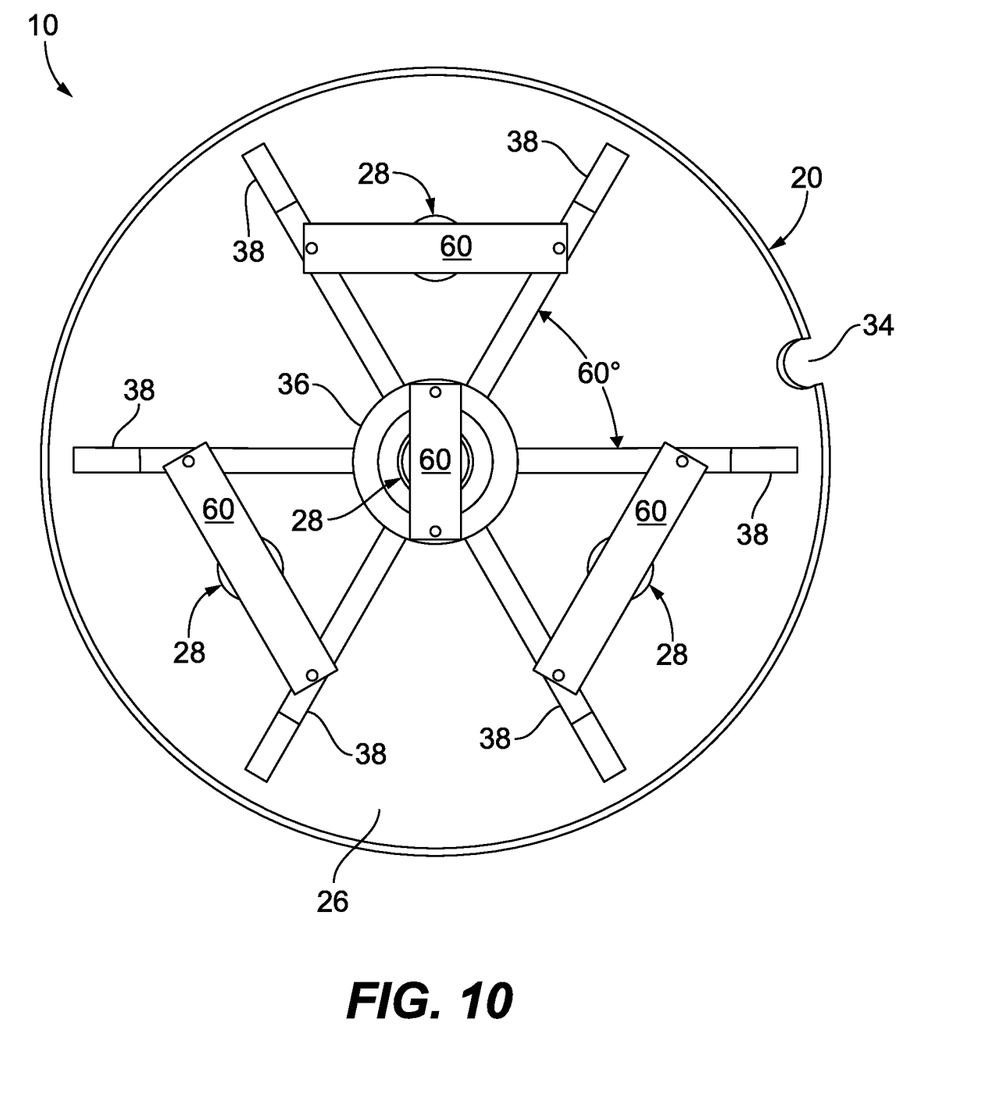
FIG. 10 is a bottom plan view of another exemplary embodiment of the utility cover assembly according to the present disclosure.
Figure 11:
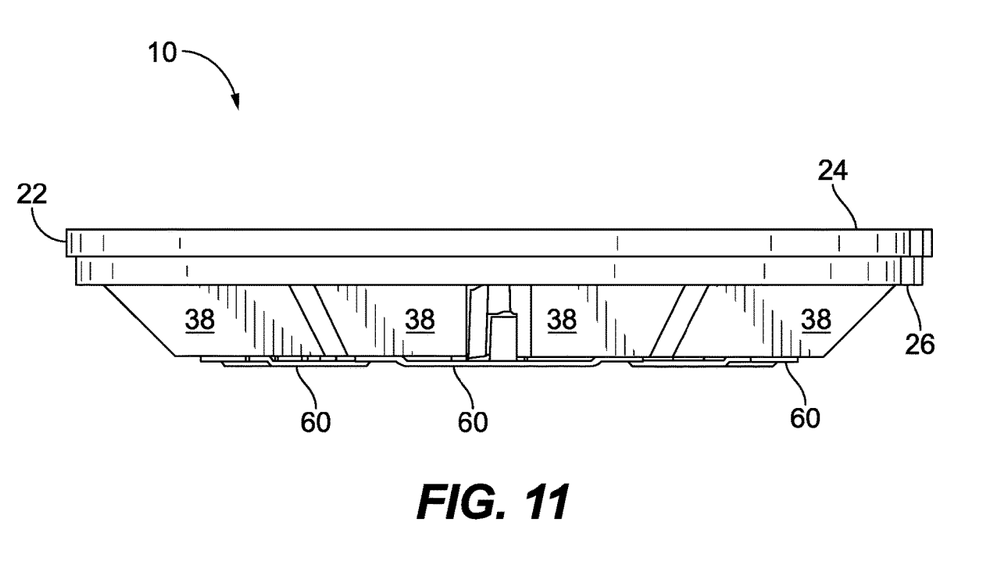
FIG. 11 is a side elevation view of the utility cover assembly of FIG. 10.

Referring to FIGS. 9 and 10, the lower side 26 of the body 22 may include a rigid apron 36 that surrounds the window 28 in the central area of the body 22 to provide structural stability to the body in the area of the window. One or more ribs 38 may extend radially from the apron 36 to form a hub-and-spoke like structure that also provide structural stability to the body 22 in the area of the window 28. The apron 36 and ribs 38 can be integrally formed into the body 22, or the apron 36 and ribs 38 can be secured to the body by for example welds or mechanical fasteners. The apron 36 and ribs 38 can be made of a rigid material sufficient to support pedestrian and/or vehicle traffic on the utility cover 20. Examples of suitable materials include cast iron, steel, and aluminum. However, the present disclosure also contemplates other configurations for the lower side 26 of the body 22. For example, the lower side 26 of the body 22 may include a grid pattern instead of the above-described hub and spoke pattern.

Figure 1:
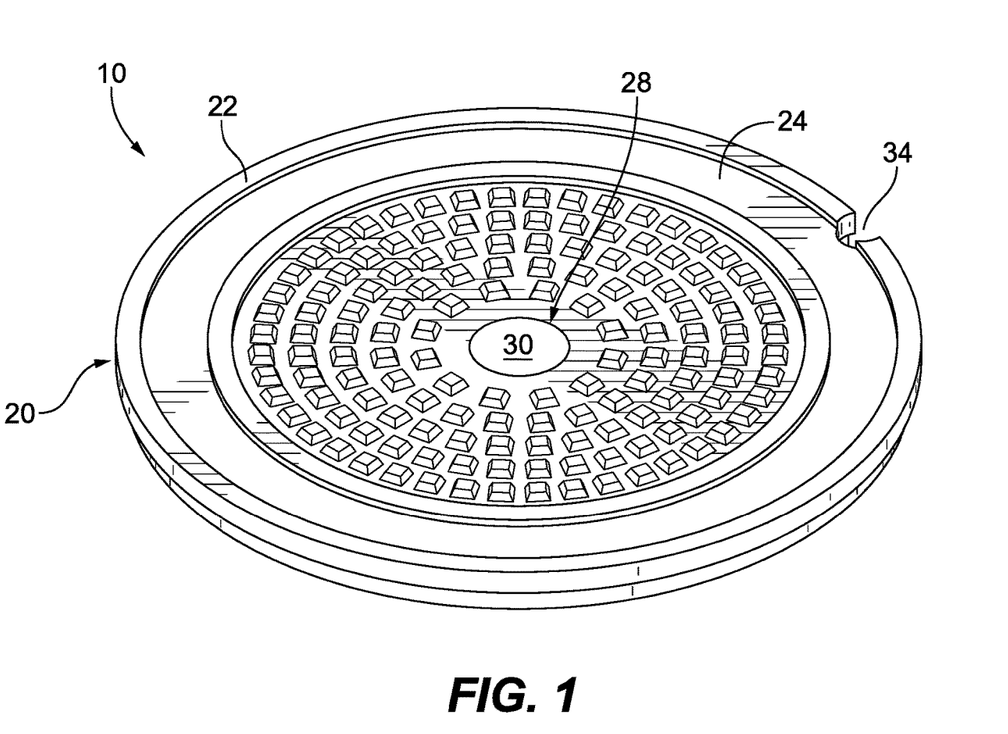
FIG. 1 is top perspective view of an exemplary embodiment of a utility cover assembly according to the present disclosure.
Figure 2:
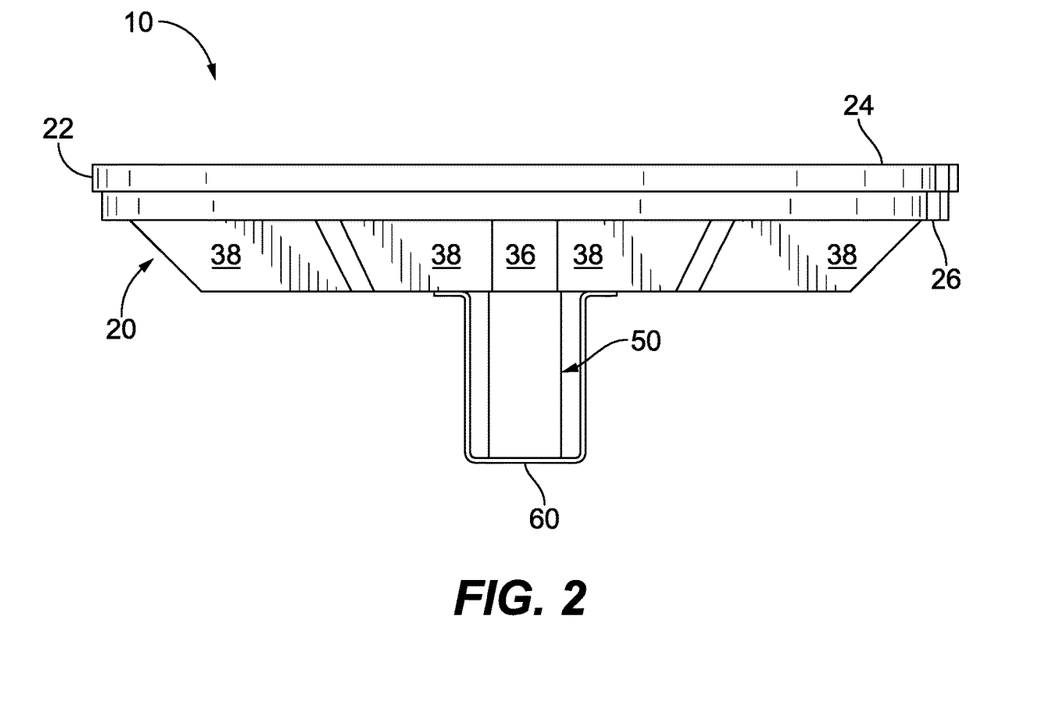
FIG. 2 is a side elevation view of the utility cover assembly of FIG. 1.
Figure 3:
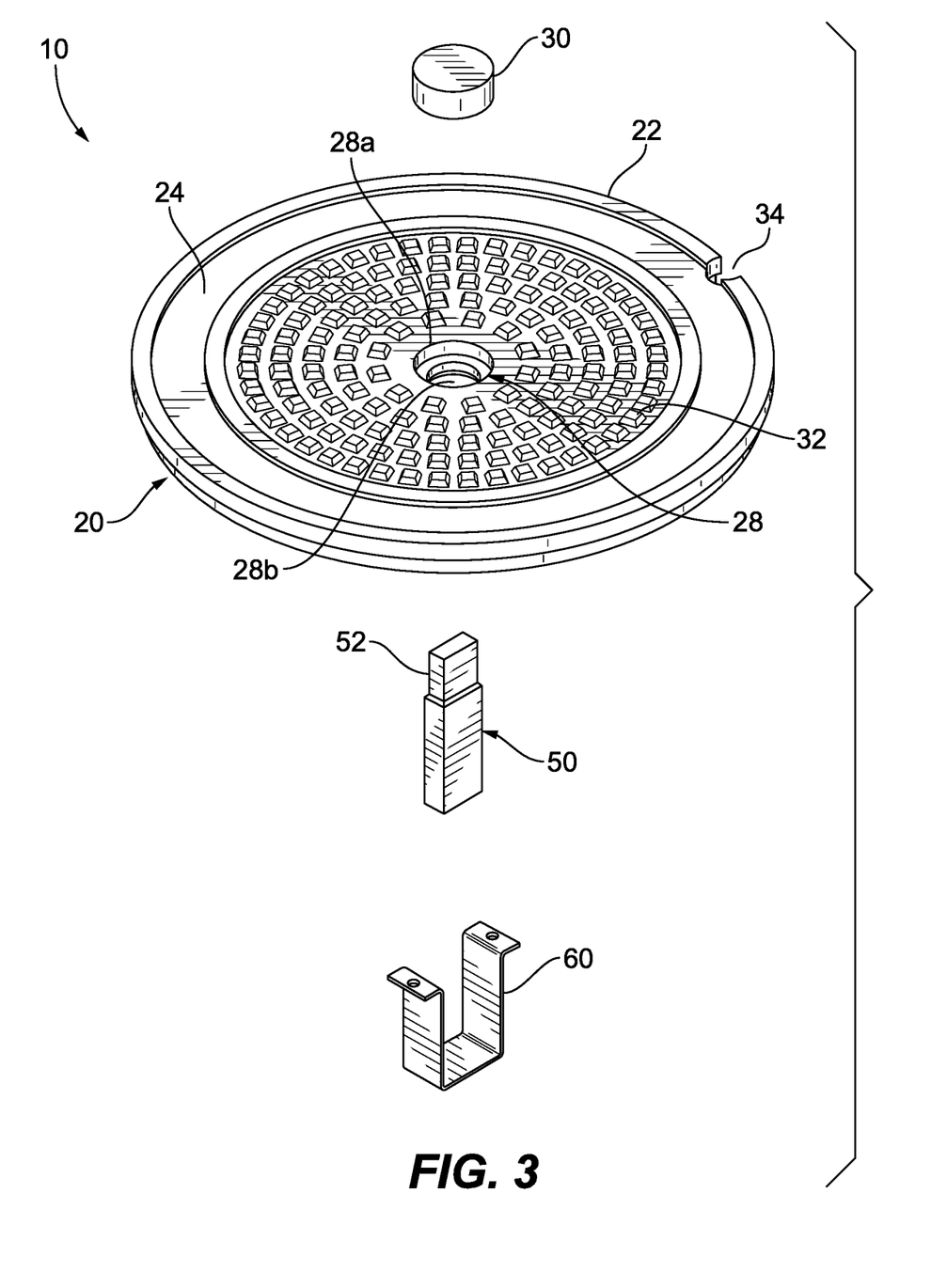
FIG. 3 is an exploded view of the utility cover assembly of FIG. 1.
Figure 4:
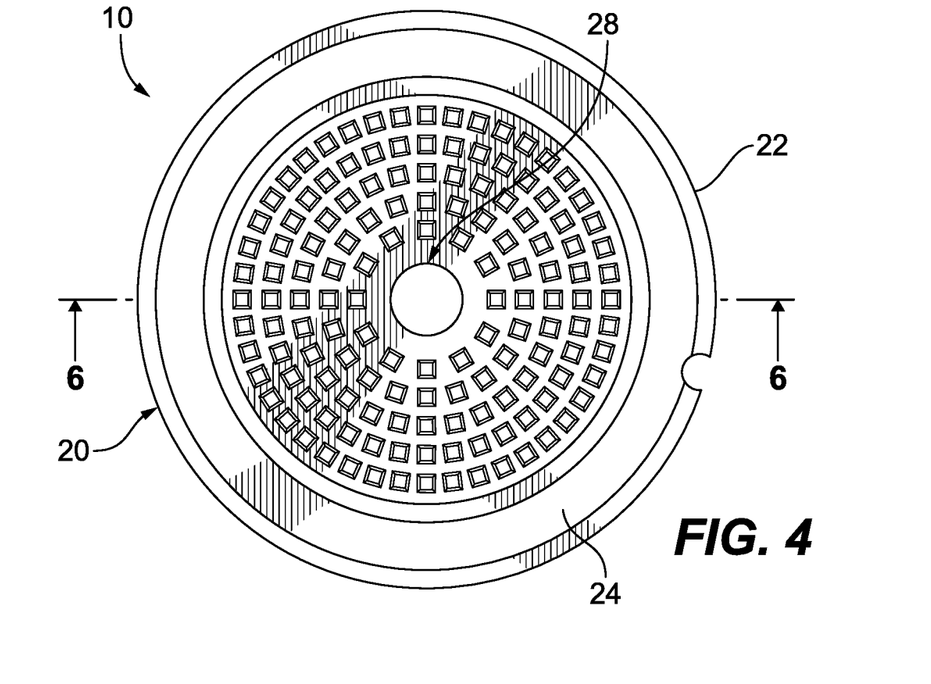
FIG. 4 is a top plan view of the utility cover assembly of FIG. 1.
Figure 5:
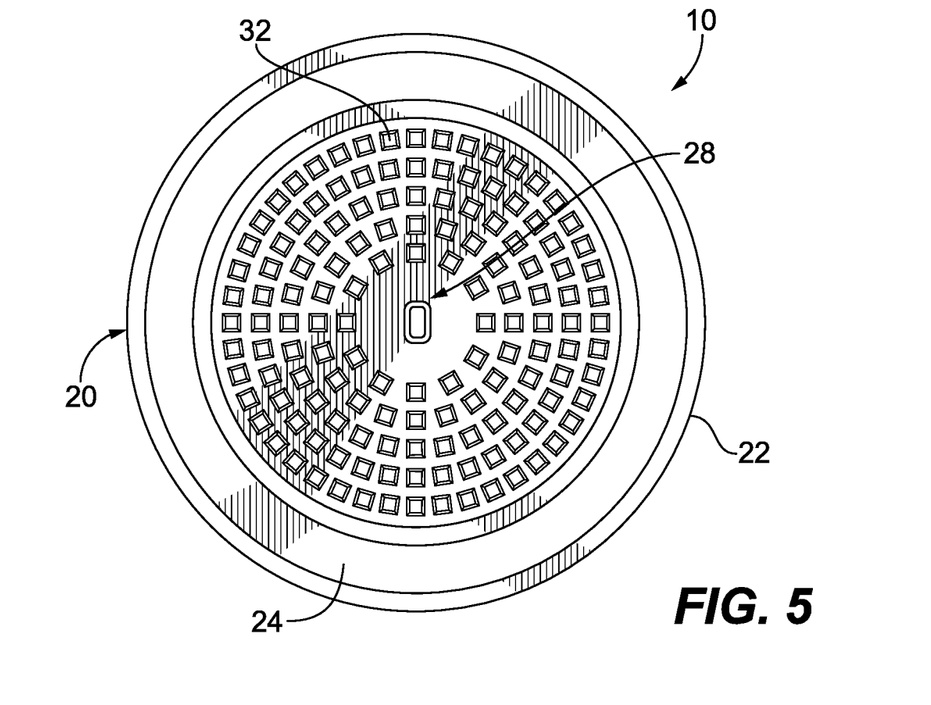
FIG. 5 is a top plan view of another exemplary embodiment the utility cover assembly of FIG. 1.
Figure 6:
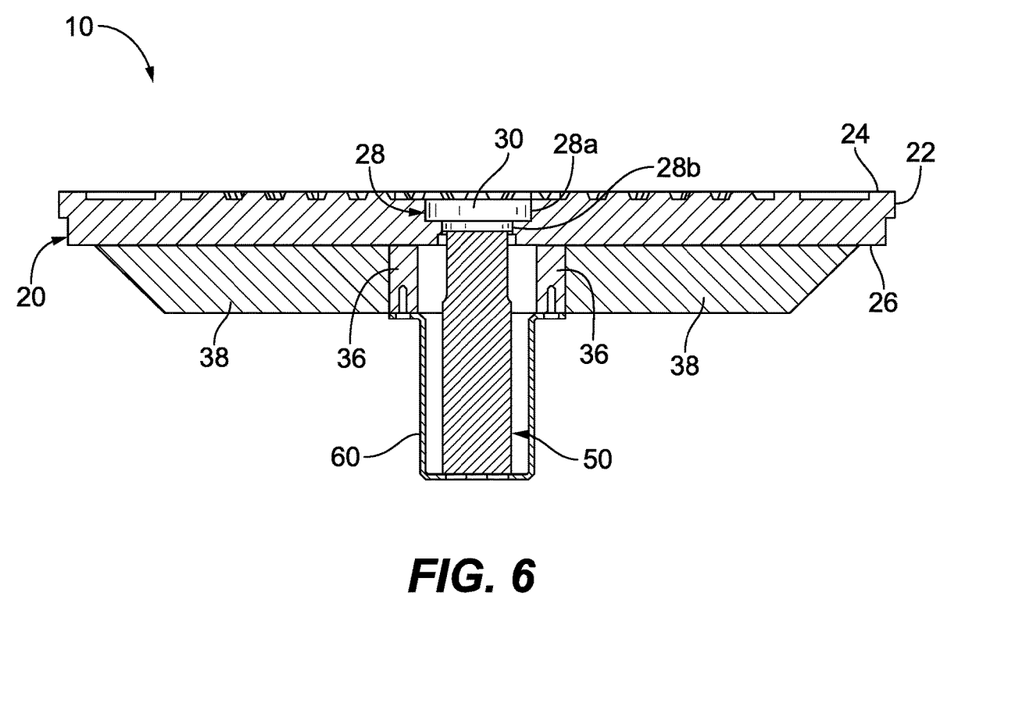
FIG. 6 is a cross sectional view of the utility cover assembly of FIG. 4 taken along line 6-6.
Figure 7:
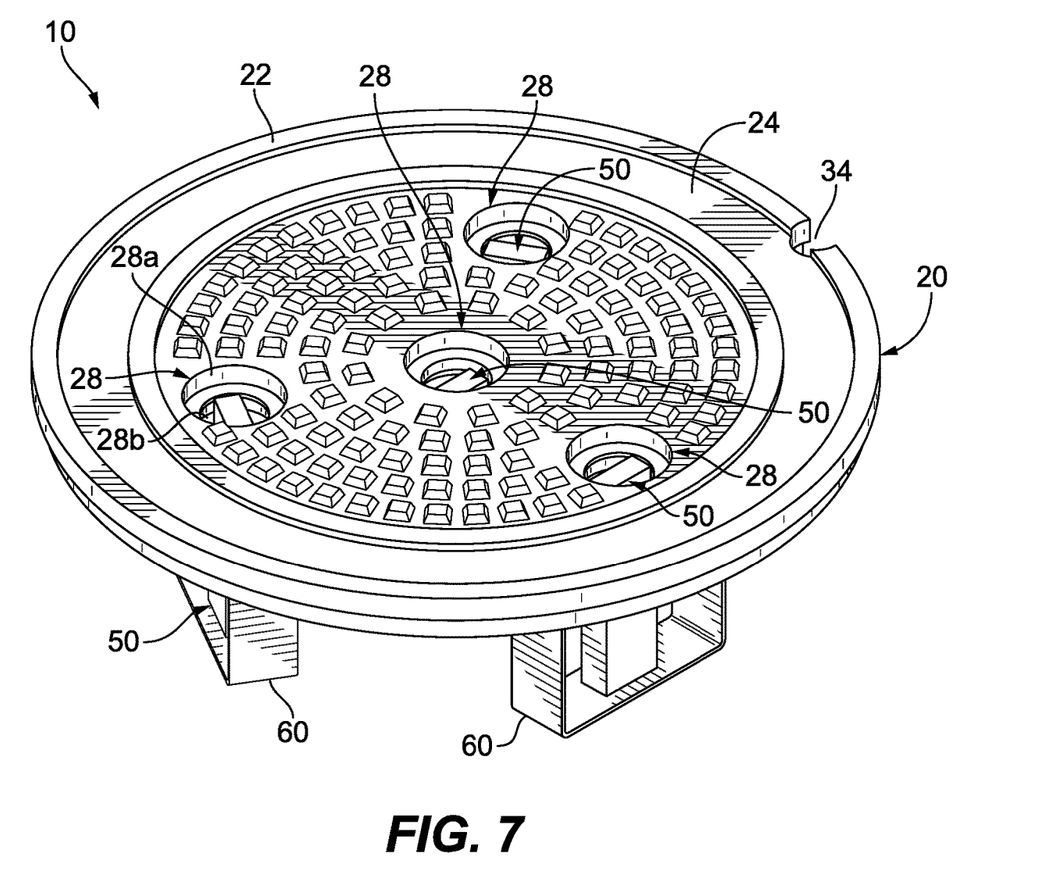
FIG. 7 is top perspective view of another exemplary embodiment of a utility cover assembly according to the present disclosure.
Figure 8:
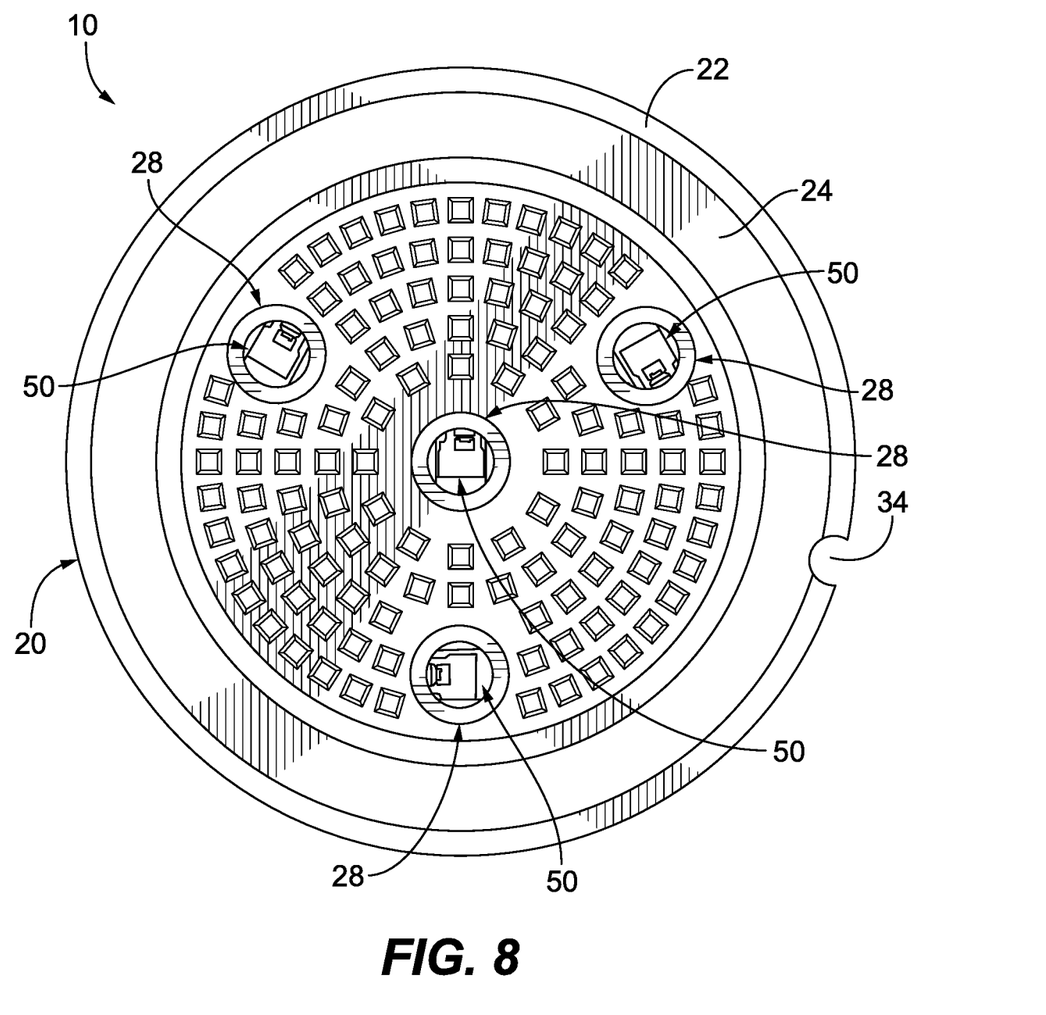
FIG. 8 is a top plan view of the utility cover assembly of FIG. 7.

In the embodiment of FIGS. 1-6 and 12, the electronic module 50 may comprise a radio receiver and/or transmitter, a power source such as a battery and associated electronic circuitry for processing information and transmitting and/or receiving radio signals through the cover. For example, the electronic module 50 may be a Itron ERT module for AMR (Automated Meter Reading) system. Itron is located at 2111 N Molter Road Liberty Lakes, Wash. 99019. Alternatively, other types of electronic modules 50 may be used depending on a particular application, for example, Badger E-Series ultrasonic monitors. Badger is located at 4545 W Brown Deer Road, Milwaukee, Wis. 53224. The Aclara Star water solutions, and Sensus M520 may also be used for electronic module 50. Alcara is located at 77 West Port Plaza Drive, St. Louis, Mo. 63146 and Sensus is located at 8601 Six Forks Road, Raleigh, N.C. 27615 A distal end 52 of the electronic module 50, seen in FIG. 3, is positioned within the window 28 so that the distal end 52 is proximate the inner diameter 28b of the window. The electronic module 50 is then secured to the lower side 26 of the body 22 using a mounting bracket 60 that is, in this exemplary embodiment, secured to the apron 36 via screws. In the embodiments shown in FIGS. 9 and 13, the electronic module 50 has a length that extends below the apron 36 so that the bracket 60 is configured as a U-shaped type bracket where the electronic module 50 is nested within the U-shape bracket 60 and the bracket 60 is secured to the apron 36. In the embodiment shown in FIGS. 10 and 11, the electronic module 50 has a length that does not extend below the ribs 38 so that the bracket 60 is configured as a flat plate where the plate contacts the electronic module 50 and the bracket 60 is secured across two ribs 38 as shown.

The plug 30 for each window 28 fits into the outer periphery dimension 28a of the window 28 and seals the window to prevent moisture from passing through the utility cover 20. Each plug 30 is made of a material that is substantially transparent to electromagnetic energy, e.g., an RF transparent material, that can withstand pedestrian and/or vehicle traffic and as well as wear or damage caused by environmental conditions. Examples of materials that are substantially transparent to electromagnetic energy include fiberglass composite, polymer concrete, polyethylene, polypropylene, and vulcanized rubber.

Figure 12:
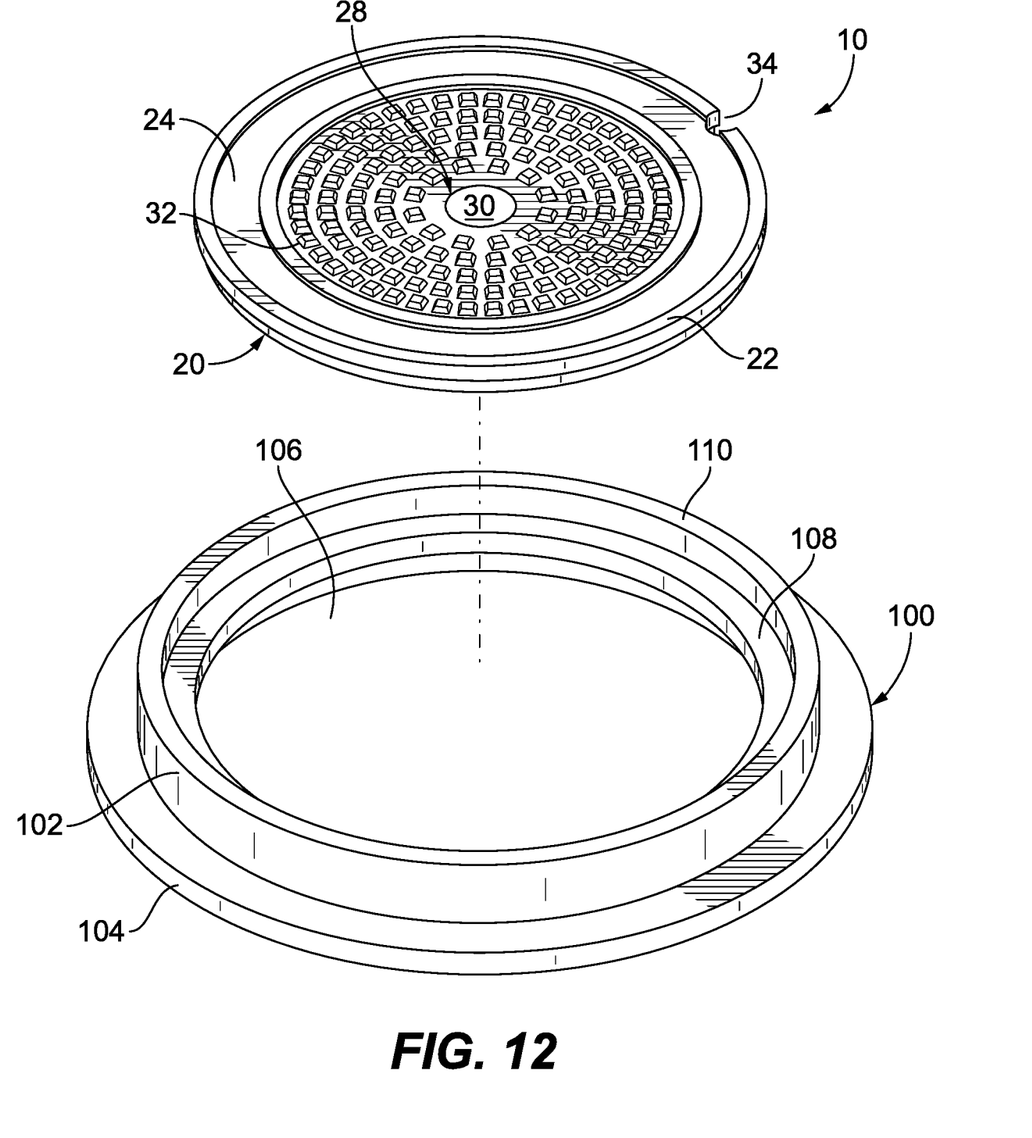
FIG. 12 is a top perspective view of the utility cover assembly of FIG. 1 separated from a frame.
Figure 13:
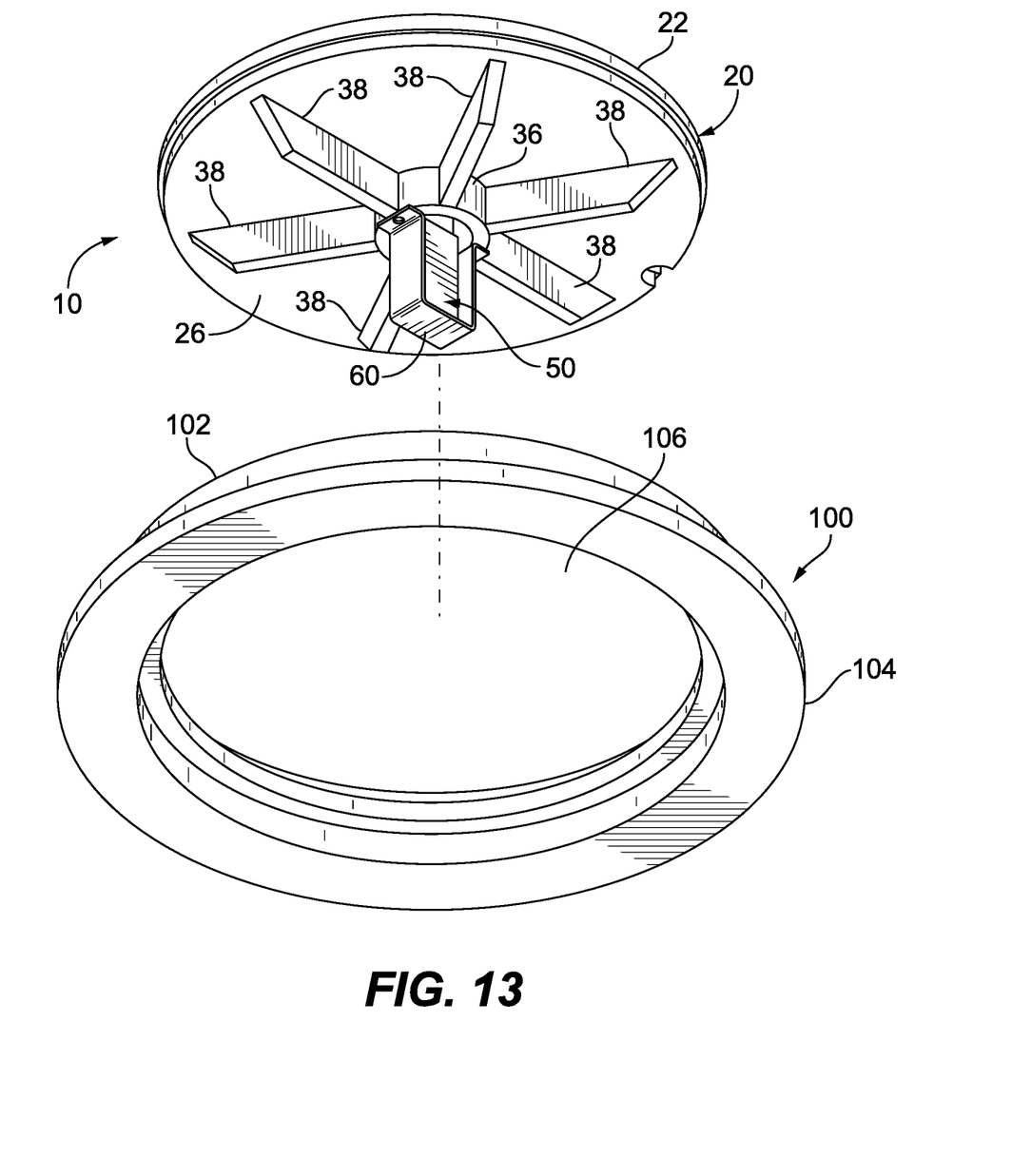
FIG. 13 is a bottom perspective view of the utility cover assembly and frame of FIG. 12.
Figure 14:
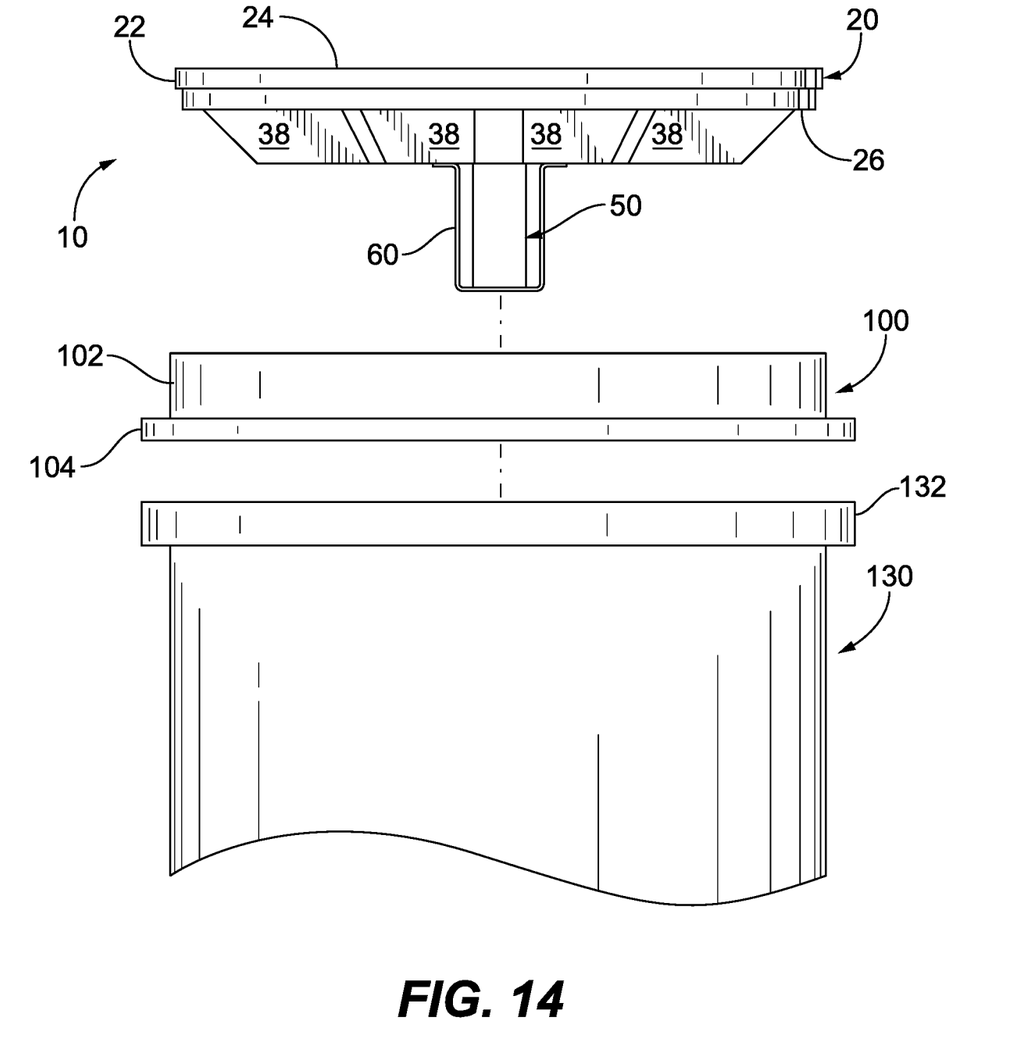
FIG. 14 is a side elevation view of the utility cover assembly and frame of FIG. 12 positioned for installation on a pipe.

As noted above, the utility cover 20 of the utility cover assembly 10 may come in a number of different shapes and dimensions to fit within a frame, such as frame 100 seen in FIGS. 12-14, that typically is mounted on or secured to a pipe or enclosure. In this exemplary embodiment, the frame 100 is a circular frame that matches the circular utility cover 20. The frame 100 has an upper ring portion 102 and a lower ring portion 104. The upper ring portion 102 of the frame 100 in the embodiment shown in FIGS. 12-13 is circular so that the circular utility cover 20 can fit within opening 106 in the upper ring portion 102 of the frame. The utility cover 20 is supported within the upper ring portion 102 by lip 108 around the inner perimeter of the upper ring portion 102. The lip 108 is located so that the upper side 24 of the body 22 of the utility cover 20 is at or near a top edge 110 of the frame 100 when installed. The lower ring portion 104 of the frame 100 is in this exemplary embodiment circular in shape to match the shape of the upper ring portion 102, and has an opening that matches the opening 106. In this embodiment, the lower ring portion 104 has a larger outer periphery than the upper ring portion 102. However, one skilled in the art would readily appreciate that the lower ring portion 104 may have a different shape than the upper ring portion 102 depending upon the shape of the pipe or enclosure. The larger outer periphery allows the frame 100 to rest on an upper edge 132 of pipe 130, seen in FIG. 14, or within a recess within the upper edge 132 of the pipe 130. The pipe 130 may allow access to a valve or meter provided below ground level. The upper edge 132 of the pipe 130 may be provided at or just below ground level so that when the utility cover 20 is inserted into the frame 100 the upper side 24 of the body 22 remains at or above ground level.

The utility cover and utility cover assemblies as described herein may be used as utility meter covers (e.g., for water, gas or electric meters), and/or utility valve covers (e.g., for water or gas valves). Utility cover assemblies as described herein may be used anywhere within a metering infrastructure where electromagnetic or acoustic signal transmission and/or reception is utilized. Other exemplary metering or flow measurement systems that may be used with the utility cover assemblies described herein include, for example, metering or flow measurement systems including the Orion® Endpoint system by Badger and metering or sensing systems including the Smartpoint® 520M pit set module by Sensus Inc.

While illustrative embodiments have been described and illustrated above, it should be understood that these are exemplary and are not to be considered as limiting. Additions, deletions, substitutions, and other modifications can be made without departing from the spirit or scope of the present disclosure. Accordingly, the invention is not to be considered as limited by the foregoing description.

What is claimed is:

1. A utility cover comprising:
   a body having an upper side and a bottom side, at least one window within the body;
   a plug positioned within the at least one window so that a top surface of the plug is substantially flush with the upper side of the body; and
   an electronic module configured to transmit electromagnetic energy or receive electromagnetic energy, the electronic module being secured to the bottom side of the body so that a distal end of the electronic module extends into at least a portion of the at least one window from the bottom side of the body and is adjacent the plug;
   the body being made from a material capable of supporting pedestrian or vehicle traffic, and the plug being made from a material that is substantially transparent to electromagnetic energy so that electromagnetic energy can pass through the plug to or from the electronic module without being substantially attenuated.

2. The utility cover according to claim 1, wherein the body is made of a metallic material.

3. The utility cover according to claim 2, wherein the metallic material comprises cast iron, steel or aluminum.

4. The utility cover according to claim 1, wherein the material substantially transparent to electromagnetic energy comprises fiberglass composite, polymer concrete, polyethylene, polypropylene or vulcanized rubber.

5. The utility cover according to claim 1, further comprising an apron secured to or integrally formed into the body and positioned to surround the at least one window.

6. The utility cover according to claim 5, further comprising at least one rib secured to or integrally formed into the body and extending radially outward from the apron.

7. A utility cover comprising:
   a body having an upper side, a bottom side, at least one window within the body, and a plug positioned within the at least one window so that a top surface of the plug is substantially flush with the upper side of the body, wherein the body is made from a material capable of supporting pedestrian or vehicle traffic, and the plug is made from a material that is substantially transparent to electromagnetic energy so that electromagnetic energy can pass through the plug without being substantially attenuated; and
   an electronic module secured to the bottom side of the body with a holding bracket and capable of transmitting electromagnetic energy or receiving electromagnetic energy, the electronic module being secured to the bottom side of the body so that a distal end of the electronic module extends into at least a portion of the at least one window from the bottom side of the body and is in close proximity to the plug.

8. The utility cover according to claim 7, wherein the body is made of a metallic material.

9. The utility cover according to claim 7, wherein the metallic material comprises cast iron, steel or aluminum.

10. The utility cover according to claim 7, wherein the material substantially transparent to electromagnetic energy comprises fiberglass composite, polymer concrete, polyethylene, polypropylene, or vulcanized rubber.

11. The utility cover according to claim 7, wherein the electromagnetic energy comprises radio frequency signals.

12. The utility cover according to claim 7, further comprising an apron secured to or integrally formed into the body and positioned to surround the at least one window.

13. The utility cover according to claim 12, further comprising at least one rib secured to or integrally formed into the body and extending radially outward from the apron.

14. A utility cover assembly comprising:
- a frame having a lip around an interior portion of the frame;
- a utility cover adapted to fit within the interior portion of the frame and rest on the lip, the utility cover including a body having an upper side, a bottom side, at least one window within the body, and a plug positioned within the at least one window so that a top surface of the plug is substantially flush with the upper side of the body, wherein the body is made from a material capable of supporting pedestrian or vehicle traffic, and the plug is made from a material that is substantially transparent to electromagnetic energy so that electromagnetic energy can pass through the plug without being substantially attenuated; and
- an electronic module secured to the bottom side of the body and capable of transmitting electromagnetic energy or receiving electromagnetic energy, the electronic module being secured to the bottom side of the body so that a distal end of the electronic module extends into at least a portion of the at least one window from the bottom side of the body and is in close proximity to the plug.

15. The utility cover according to claim 14, further comprising a holding bracket for securing the electronic module to the bottom side of the body.

16. The utility cover according to claim 14, wherein the body is made of a metallic material.

17. The utility cover according to claim 16, wherein the metallic material comprises cast iron, steel or aluminum.

18. The utility cover according to claim 14, wherein the material substantially transparent to electromagnetic energy comprises fiberglass composite, polymer concrete, polyethylene, polypropylene, or vulcanized rubber.

19. The utility cover according to claim 14, further comprising an apron secured to or integrally formed into the body and positioned to surround the at least one window.

20. The utility cover according to claim 19, further comprising at least one rib secured to or integrally formed into the body and extending radially outward from the apron.

* * * * *